(12) United States Patent
Lee

(10) Patent No.: US 8,261,954 B2
(45) Date of Patent: Sep. 11, 2012

(54) MOUNT WITH ANTI-ROTATION FEATURE

(75) Inventor: Michael Lee, Winter Garden, FL (US)

(73) Assignee: High Gear Specialties, Inc., Winter Garden, FL (US)

( * ) Notice: Subject to any disclaimer, the term of this patent is extended or adjusted under 35 U.S.C. 154(b) by 382 days.

(21) Appl. No.: 12/711,767

(22) Filed: Feb. 24, 2010

(65) Prior Publication Data

US 2011/0204111 A1 Aug. 25, 2011

(51) Int. Cl.
*B60R 7/04* (2006.01)

(52) U.S. Cl. .......................... 224/282; 224/553; 224/558

(58) Field of Classification Search .................. 224/282, 224/276, 420, 441, 443, 448, 452, 454, 548, 224/553, 558, 929, 197, 200, 564; 403/165, 403/195, 196, 256, 310, 312, 313, 109.5, 403/109.3, 97, 78, 71, 87, 316, 96, 315, 319
See application file for complete search history.

(56) References Cited

U.S. PATENT DOCUMENTS

| | | | | |
|---|---|---|---|---|
| 111,152 A * | 1/1871 | Smith | ............................ | 403/312 |
| 2,447,080 A * | 8/1948 | Meier | ............................ | 84/280 |
| 2,664,259 A * | 12/1953 | Rose | ............................ | 248/337 |
| 2,922,669 A * | 1/1960 | Hansen | ............................ | 403/96 |
| 3,734,439 A * | 5/1973 | Wintz | ............................ | 248/224.51 |
| 3,851,983 A * | 12/1974 | MacKenzie | ............................ | 403/312 |
| 5,109,411 A * | 4/1992 | O'Connell | ............................ | 379/454 |
| 5,114,060 A * | 5/1992 | Boyer | ............................ | 224/413 |
| 5,260,731 A | 11/1993 | Baker, Jr. | | |
| 5,522,527 A * | 6/1996 | Tsai | ............................ | 224/414 |
| 5,661,942 A * | 9/1997 | Palmer | ............................ | 52/653.2 |
| 5,816,732 A * | 10/1998 | Nissen | ............................ | 403/327 |
| 5,941,488 A * | 8/1999 | Rosen | ............................ | 248/278.1 |
| 5,980,149 A * | 11/1999 | Colclough et al. | ............................ | 403/312 |
| 6,317,497 B1 * | 11/2001 | Ou | ............................ | 379/454 |
| 6,378,815 B1 * | 4/2002 | Lee | ............................ | 248/121 |
| 6,522,748 B1 * | 2/2003 | Wang | ............................ | 379/446 |
| 6,561,400 B2 * | 5/2003 | Lee | ............................ | 224/413 |
| 6,945,441 B2 * | 9/2005 | Gates et al. | ............................ | 224/401 |
| D566,648 S | 4/2008 | Lee | | |
| 2005/0006542 A1 * | 1/2005 | Henning et al. | ............................ | 248/274.1 |
| 2008/0179478 A1 | 7/2008 | Lee | | |

FOREIGN PATENT DOCUMENTS

GB 1 242 484 A 8/1971
WO 2008112687 A1 9/2008

* cited by examiner

*Primary Examiner* — Justin Larson
(74) *Attorney, Agent, or Firm* — GrayRobinson, P.A.

(57) ABSTRACT

A mount for motorcycles and other vehicles is provided that resists relative rotational movement at the connection between the mount and the vehicle, and at the connection between the mount and a plate that supports a portable device such as a GPS, toll transponder, radar collector and the like, while permitting disengagement at such connections in response to the application of a force to the mount.

19 Claims, 8 Drawing Sheets

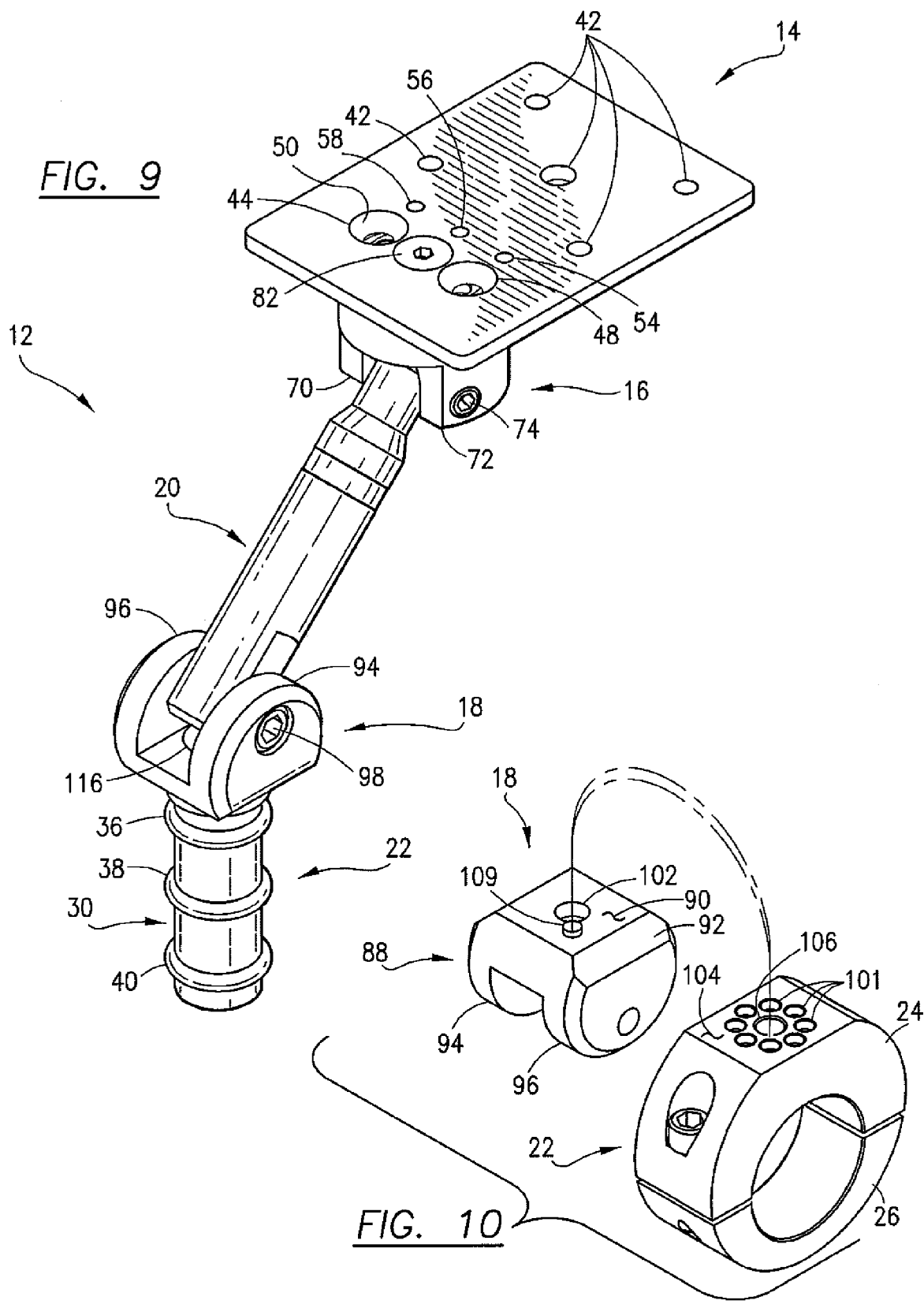

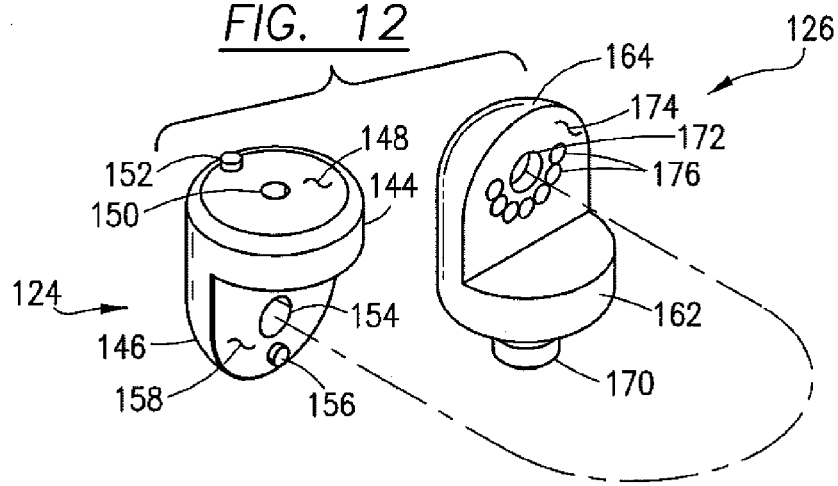
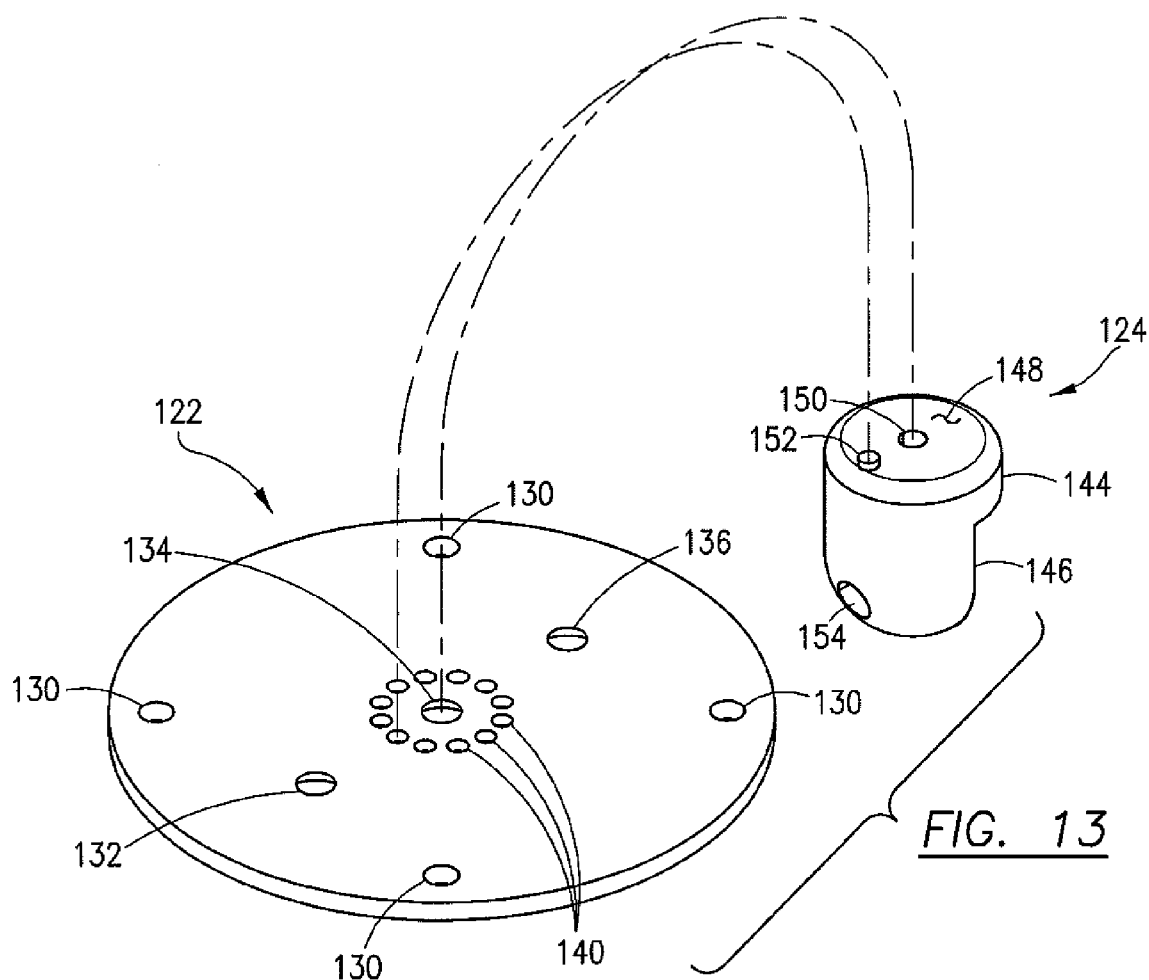

MOUNT WITH ANTI-ROTATION FEATURE

FIELD OF THE INVENTION

This invention relates to mounts for securing portable devices to vehicles, and, more particularly, to a vehicle mount that resists relative rotational movement at the connection between the mount and the vehicle and at the connection between the mount and the portable device while permitting disengagement at such connections in response to the application of a severe force to the mount.

BACKGROUND OF THE INVENTION

High fuel prices and traffic congestion have made motorcycles an increasingly common mode of transportation, not only for recreational purposes but for people commuting to and from their place of employment. While production motorcycles may include some amenities found in automobiles and other vehicles, such as a radio, they have no means of providing riders with ready access to items such as radar detectors, toll road transponders, global positioning devices (GPS), cellular telephones, cameras, change holders, garage door openers, personal digital assistants (PDA) and other portable devices.

This deficiency of production motorcycles has been addressed by aftermarket mounting devices that may be secured to different parts of the vehicle. These include handlebar mounts, control mounts, stem mounts, fairing mounts, mirror mounts and different specialty mounts. In each case, the mount generally comprises a vehicle mounting element designed to attach to a part of the motorcycle such as the handlebars, a lower pivot coupled to the vehicle mounting element, a device mounting plate designed to support a number of different portable devices, an upper pivot coupled to the device mounting plate, and, a shaft extending between the upper and lower pivots. The mount is connected to the motorcycle and a portable device such as a GPS is secured to the device mounting plate, at which time the position of the GPS may be adjusted by manipulation of one or both of the upper and lower pivots to the satisfaction of the rider. This arrangement allows the cyclist ready access to and/or viewing of a given portable device, and reduces potentially dangerous situations wherein the rider must reach into a pocket of his or her clothing, or a storage area of the motorcycle, to access a particular device while riding.

Most vehicle mount designs employ a threaded connection between the vehicle mounting element and lower pivot, and between the device mounting plate and upper pivot, in order to secure them in a fixed position. Typically, a bolt or other threaded fastener is extended between such elements and tightened down to maintain the portable device in position during use. This arrangement is less than desirable in several respects. Because vehicle mounts of this type are aftermarket items, they are usually installed by the owner of the motorcycle. Although installation is not difficult, it can be done improperly such as by failing to adequately tighten the bolts or other fasteners. Further, threaded connections between the vehicle mounting element and lower pivot, and/or between the device mounting plate and upper pivot, can loosen over time given the vibration and jarring of the motorcycle that takes place when riding. In either case, if such connections become loose the vehicle mount can pivot to an undesirable position and distract the rider potentially leading to injury.

Another potential problem with threaded connections of the type utilized in conventional aftermarket vehicle mounts involves the performance of the mount in the event of an accident. It has been found that the application of a sufficient force to a vehicle mount, such as resulting from an impact during an accident, can cause the portable device secured to the device mounting plate or the entire mount itself to literally fly off of the location where it is mounted to the motorcycle. A heavier item such as a GPS can effectively become a missile under these circumstances and cause injury to the rider or to others in the vicinity of the accident.

SUMMARY OF THE INVENTION

This invention is directed to a vehicle mount in which a severable pin connection is provided at the location where the mount is coupled to the vehicle and where the mount is coupled to a portable device. These pin connections help resist relative movement at such locations under normal operating conditions of the vehicle, but may be severed in response to the application of a severe force to the mount, such as during an accident, to resist disengagement of the portable device from the vehicle.

In one presently preferred embodiment, the vehicle mount of this invention comprises a vehicle mounting element having an anti-rotation pin that seats within a selected one of a number of cavities formed in the facing surface of a lower coupler to which it is connected. The mount also includes a device mounting plate formed with an anti-rotation pin that seats within one of a number of cavities in the facing surface of an upper coupler. Alternatively, the positioning of the anti-rotation pins and cavities may be reversed, i.e. the anti-rotation pins may be formed in the upper and lower couplers while the vehicle mounting element and device mounting plate have cavities or through bores to receive such pins. It is contemplated that the upper and lower couplers may be connected together by a shaft, or they may be directly connected to one another in which case one of the upper and lower couplers is formed with at least one cavity and the other an anti-rotation pin.

In one embodiment, a threaded connection is provided between the vehicle mounting element and lower coupler, and between the device mounting plate and upper coupler. Alternatively, the lower coupler may be mounted to the vehicle mounting element by clamping an extension formed in the lower coupler between two clamping sections of the vehicle mounting element. Further, the two couplers may be connected to one another by a threaded fastener. In all embodiments, additional resistance to relative rotation of the mount components is provided by connection of the anti-rotation pins within selected cavities. Even if a bolt or other threaded fastener that connects the vehicle mount elements together should loosen to some extent, unwanted rotation of such elements relative to one another is substantially prevented by the anti-rotation pins.

Another important feature of this invention involves its performance in response to the application of a severe force, such as might occur during an accident. In the presently preferred embodiment, the anti-rotation pins are formed of a first material and the structure formed with cavities or through holes is made of a second material. One of the first and second materials is softer than the other. Consequently, in response to the application of a sufficient force to the vehicle mount, shearing occurs at the interface between the anti-rotation pins and the cavity or hole in which they are seated. This permits relative rotation between the upper and lower couplers and the device mounting plate and vehicle mounting element, respectively, and/or between the two couplers, which helps to prevent the portable device supported by the mount, or the mount itself, from being dislodged from the motorcycle. The mount essentially "gives way" at the threaded connections, without coming apart, so that the brunt of the force from the accident or the like causes rotation of the mount components rather than separating them from the vehicle.

BRIEF DESCRIPTION OF THE DRAWINGS

The structure, operation and advantages of the presently preferred embodiment of this invention will become further apparent upon consideration of the following description, taken in conjunction with the accompanying drawings, wherein:

FIG. 9 is a perspective view of a stem mount according to this invention;

FIG. 10 is a view similar to FIG. 3 except depicting an anti-rotation pin mounted to the couple and cavities formed in the vehicle mounting element;

FIG. 12 is a disassembled, perspective view of the couplers depicted in FIG. 11;

FIG. 13 is a disassembled, perspective view of the connection between the upper coupler and mounting plate of the mount shown in FIG. 11.

DETAILED DESCRIPTION OF THE INVENTION

Figure 1:
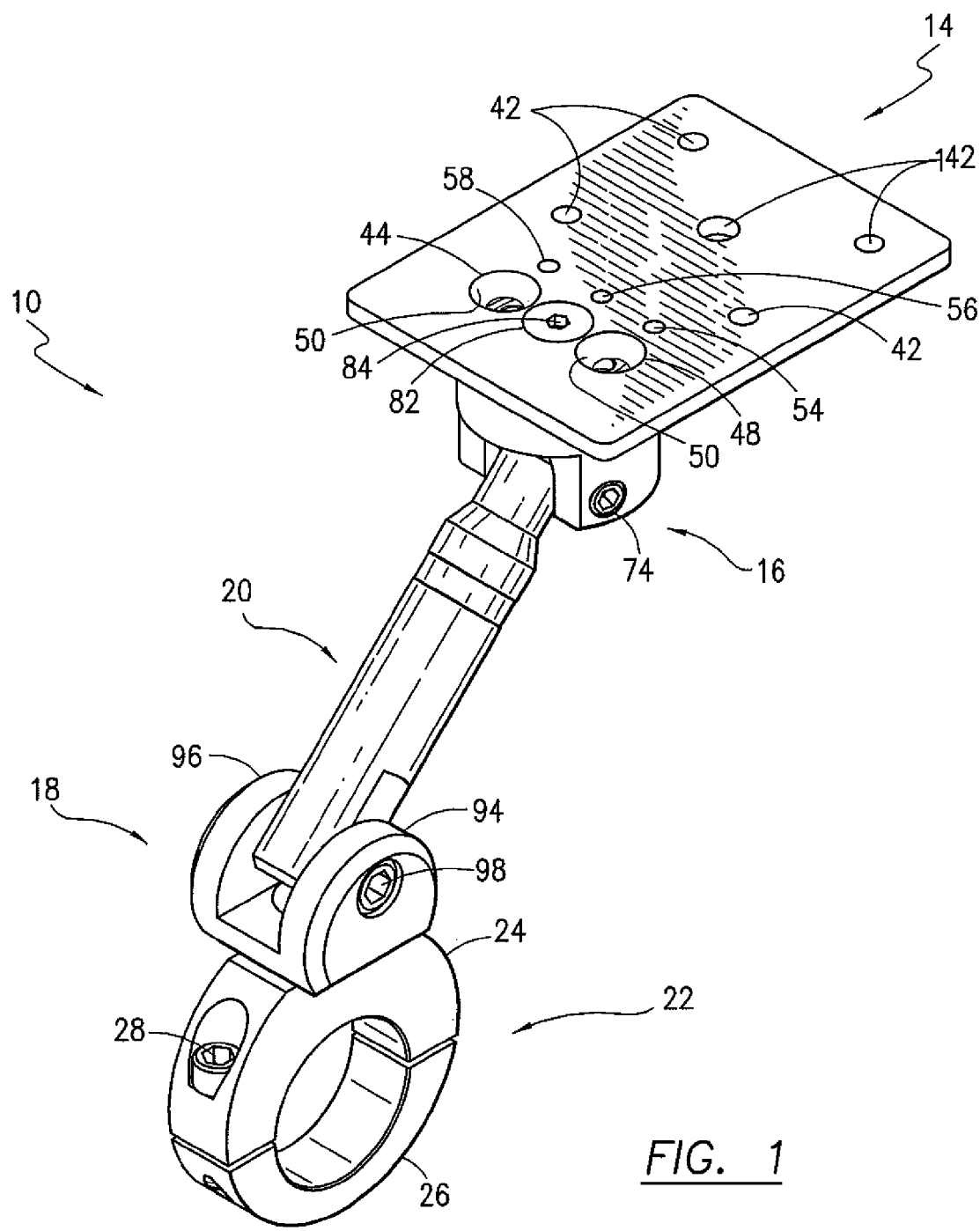
FIG. 1 is perspective view of a handlebar mount according to this invention.
Figure 8:
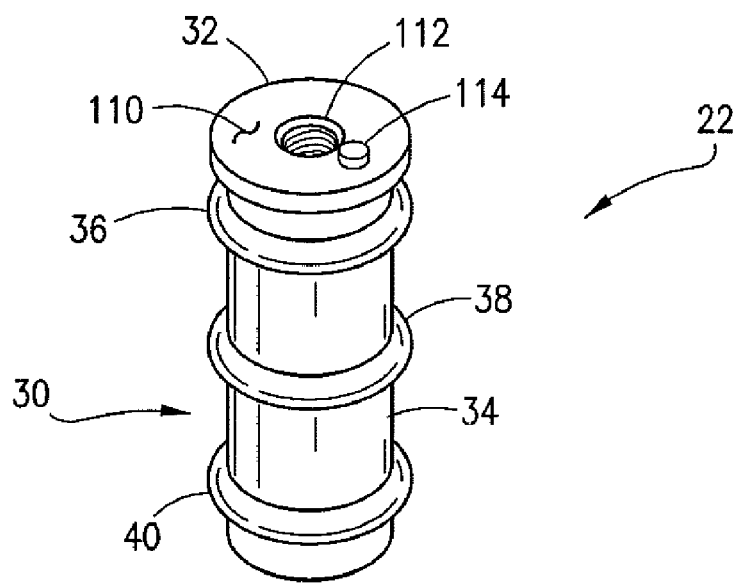
FIG. 8 is a perspective view of a vehicle mounting element for the stem mount illustrated in FIG. 9.

Referring initially to FIGS. 1, 8 and 9, two types of vehicle mounts according to this invention are shown. As discussed above, mounts for supporting portable items such as radar detectors, toll road transponders, GPS devices, cellular telephones, cameras, change holders, garage door openers, PDAs, radios and other devices have been designed for attachment to different locations on motorcycles and other vehicles. For purposes of illustration, a handlebar mount 10 is depicted in FIG. 1 and a stem mount 12 is shown in FIG. 9. It should be understood that the following discussion applies to any type of vehicle mount for motorcycles and other vehicles, and is not intended to be limited to the mounts 10 and 12.

Each of the mounts 10 and 12 comprises a device mounting plate 14, an upper coupler 16, a lower coupler 18, a shaft 20 connected between the upper and lower couplers 16, 18, and, a vehicle mounting element 22. The term "vehicle mounting element" as used herein is meant to broadly refer to any structure that secures the mount 10 or 12 to the motorcycle or other vehicle. In the case of the handlebar mount 10 shown in FIG. 1, the vehicle mounting element 22 comprises an upper clamp section 24 and a lower clamp section 26 which extend around the handlebar of a motorcycle (not shown) and are connected to one another by one or more bolts 28. The vehicle mounting element 22 of the stem mount 12 comprises a rod 30 having a radially outwardly extending upper end 32 and an outer surface 34 that mounts three o-rings 36, 38 and 40. Additional structure of the vehicle mounting elements 22 is described below. For purposes of the present discussion, the terms "upper," "lower," "top" and "bottom" refer to the orientation of the mounts 10 and 12 as depicted in FIGS. 1 and 9.

Figure 2:
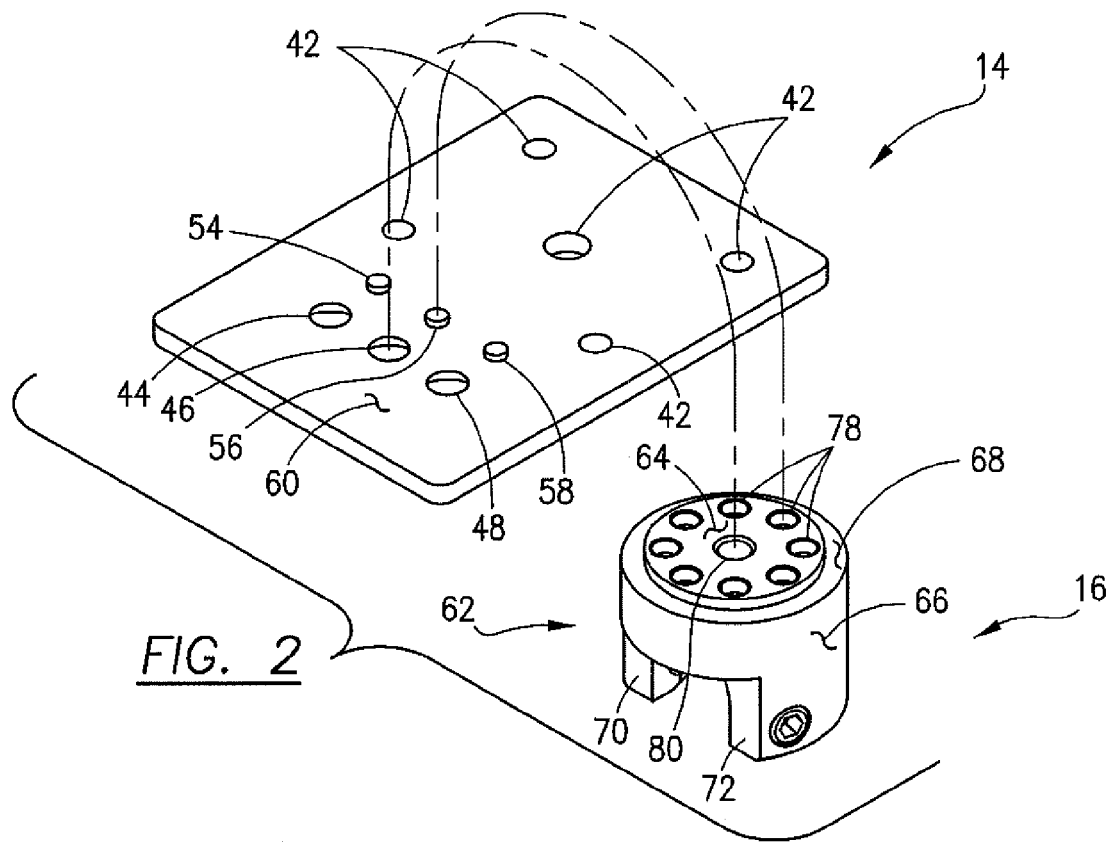
FIG. 2 is a disassembled, bottom perspective view of the device mounting plate and upper pivot of the mount shown in FIG. 1.
Figure 3:
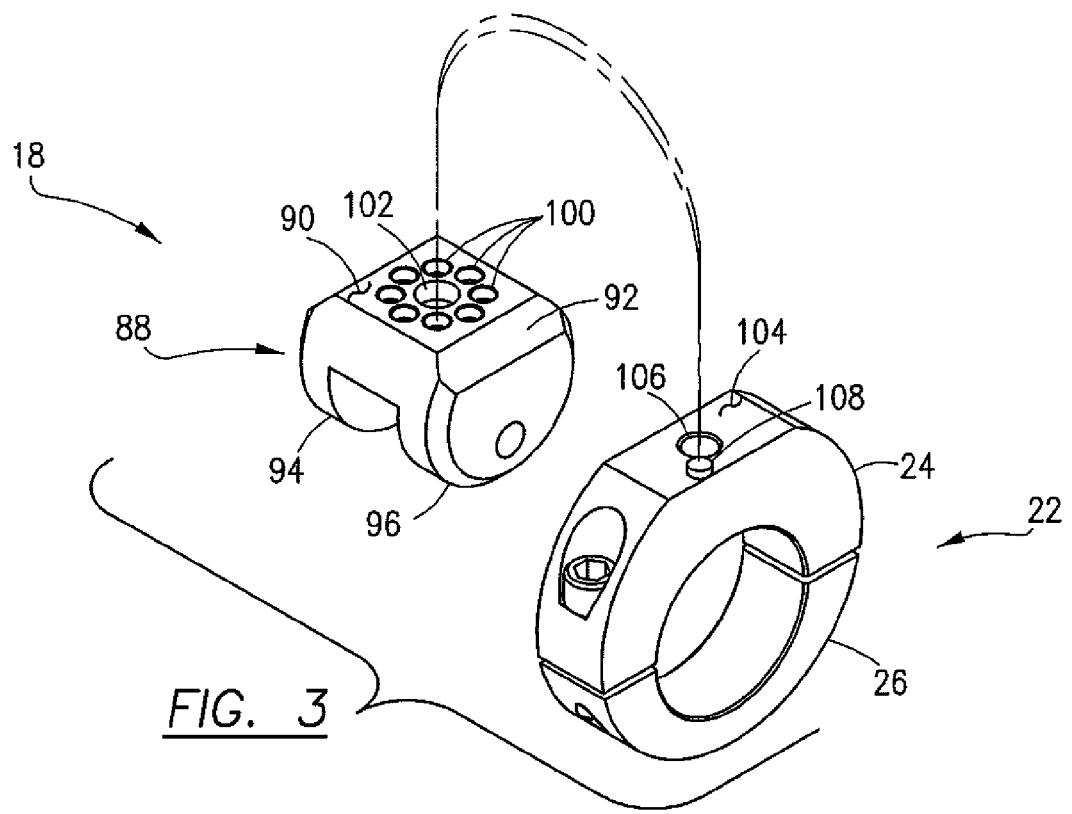
FIG. 3 is a disassembled, perspective view of the vehicle mounting element and lower pivot of the mount depicted in FIG. 1.
Figure 4:
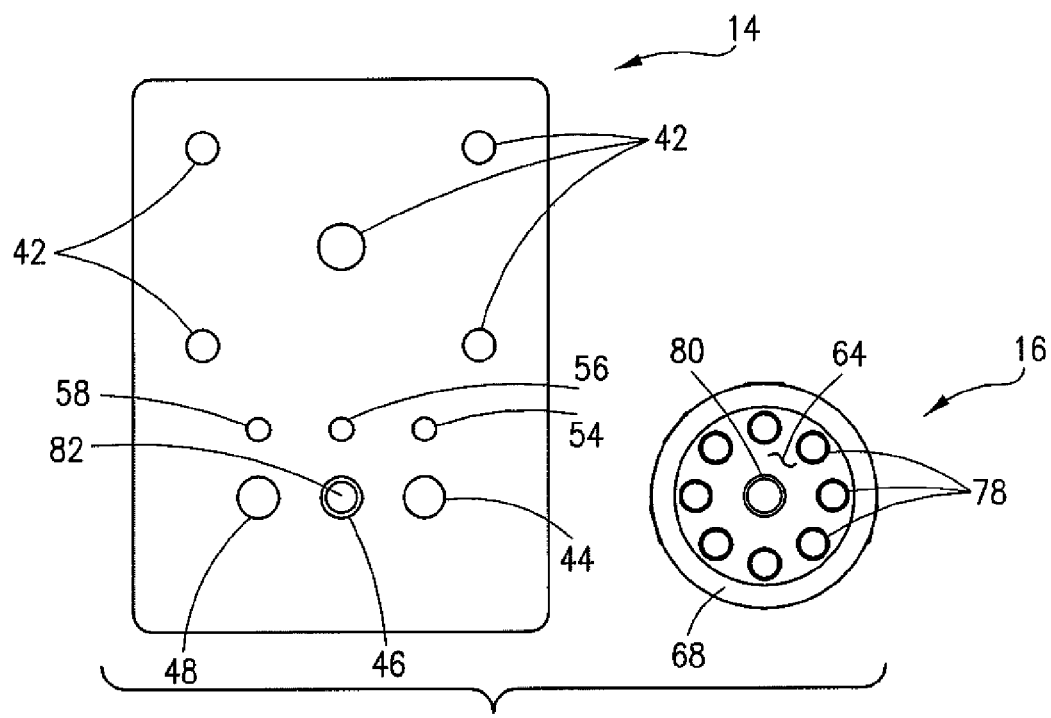
FIG. 4 is a plan view of the device mounting plate and upper pivot illustrated in FIG. 2.

With reference to FIGS. 1-3, the handlebar mount 10 is described in more detail. The device mounting plate 14 is generally rectangular-shaped formed with a number of device bores 42 arranged in a pattern that permits coupling to a number of different portable devices of the type noted above.

Such devices may include mounting structure such as threaded studs (not shown) extending from the bottom of the device through one or more of the device bores 42 to receive nuts (not shown) for mounting the device onto the plate 14. Three through bores 44, 46 and 48 are formed near one end of the plate 14, as shown, and have a chamfer 50 at the top surface 52 of the plate 14.

As best seen in FIG. 2, three anti-rotation pins 54, 56 and 58 are connected to the bottom surface 60 of the plate 14 and extend outwardly therefrom. The pins 54-58 generally align with respective through bores 44-48. The pins 54-58 may be formed of a material having a hardness greater or less than that of the upper coupler 16, for purposes to become apparent below.

The upper coupler 16 comprises a body portion 62 having an upper planar surface 64, an outer surface 66 and a beveled surface 68 extending between the planar surface 64 and outer surface 66. Two spaced arms 70 and 72 extend downwardly from the body portion 62 to receive the upper end of shaft 20 which is coupled thereto by a bolt 74. A number of blind holes 78, each defining a cavity, are formed in the body portion 62. The blind holes 78 are circumferentially spaced from one another and radially spaced from an internally threaded bore 80 located at the center of the upper planar surface 64.

The blind holes 78 and threaded bore 80 extend from the upper planar surface 64 of the body portion 62 in a downward direction toward the aims 70, 72.

The device mounting plate 14 and upper coupler 16 are connected to one another by a bolt 82 preferably having a head with a countersunk recess 84 shaped to fit an Allen wrench (not shown). As best seen in FIGS. 2 and 4-7, the device mounting plate 14 and upper coupler 16 are oriented relative to one another such that the planar surface 64 of the upper coupler 16 rests against the bottom surface 60 of the device mounting plate 14, with the internally threaded bore 80 in the upper pivot placed in alignment with one of the through bores 44, 46 or 48 of the device mounting plate 14 and one of the anti-rotation pins 54, 56 or 58 seated within one of the blind holes 78. The bolt 82 is inserted through whichever through bore 44, 46 or 48 is placed in alignment with the internally threaded bore 80 in the upper coupler 16, and then tightened down. The head of the bolt 82 is tapered to fit within the chamfer 50 of the through bores 44-48 so that it is flush with the upper surface 52 of the device mounting plate 14.

The purpose of providing multiple through bores 46-48 in the device mounting plate 14 is to permit variation of its position relative to the upper coupler 16 and the rest of the mount 10 or 12. Depending upon the configuration of a particular motorcycle or other vehicle, and/or the preferences of the rider, it may be necessary to shift the position of the device mounting plate 14 to avoid an obstruction or to place an item carried on the mount 10 in a more convenient location for the rider. Any one of the through bores 44, 46 or 48 may be aligned with the internally threaded bore 80 of the upper coupler 16, such as the middle bore 46 as shown in FIG. 5 or the bore 48 as depicted in FIG. 6.

Figures 5, 6:
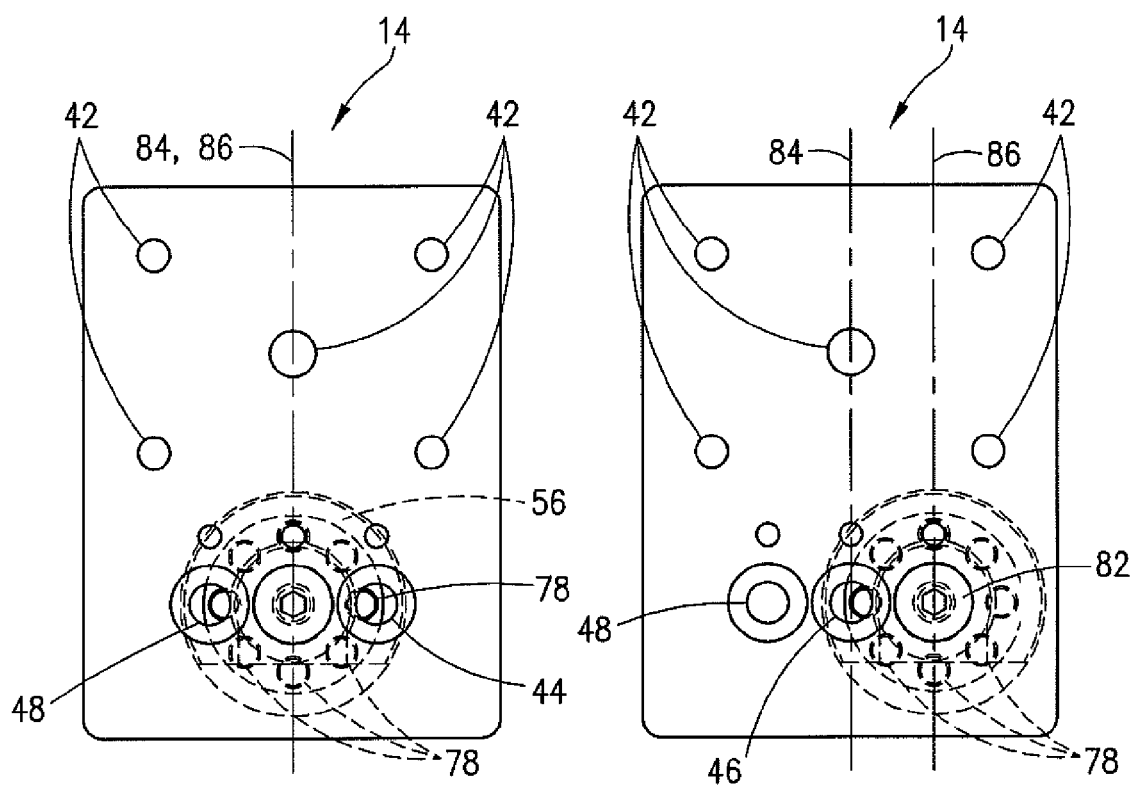
FIG. 5 is an assembled view of the device mounting plate and upper pivot shown in FIG. 4, with such components in a first position.
FIG. 6 is a view similar to FIG. 5 except with such components in a second position.
Figure 7:
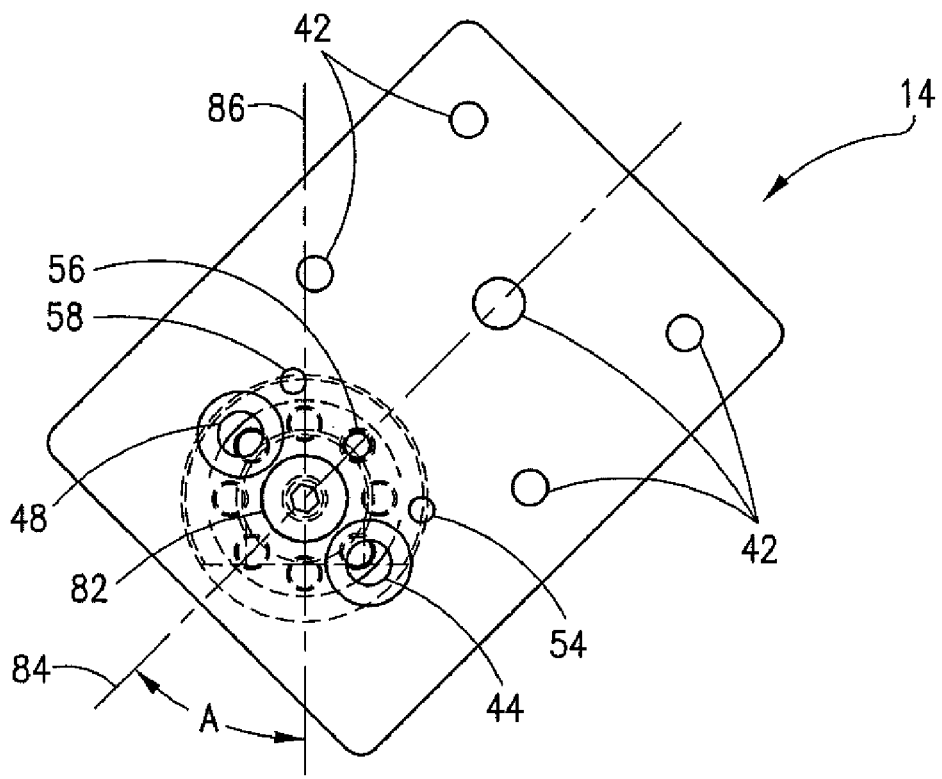
FIG. 7 is a view similar to FIG. 5 with the device mounting plate rotated in a clockwise direction.

In addition to side-to-side adjustment of the position of the device mounting plate 14 relative to the upper coupler 16, as illustrated in FIGS. 5 and 6, the device mounting plate 14 may be oriented at an angle with respect to the upper coupler 16 as shown in FIG. 7. The term "angle" in this context refers to the relationship between the longitudinal axis 84 of the device mounting plate 14 and an axis 86 that bisects the internally threaded bore 80 of the upper coupler 16 in between the two arms 70 and 72. As viewed in FIG. 5, the axes 84 and 86 are essentially coincident with one another. In FIG. 6, the device mounting plate 16 has been moved toward one side of the upper coupler 16, e.g. with the through bore 44 in alignment with the internally threaded bore 80, but no "angle" is formed between the axes 84 and 86 because they are substantially parallel to one another. In both FIGS. 5 and 6, the same blind hole 78 in the upper coupler 16 receives the middle anti-rotation pin 56 (FIG. 5) or the anti-rotation pin 54 (FIG. 6) located on the device mounting plate 14. The device mounting plate 14 may be turned or oriented at an angle relative to the upper coupler 16 by aligning one of the anti-rotation pins 54-58 with a different blind hole 78 such that the axes 84 and 86 form an angle relative to one another. In FIG. 7, the middle anti-rotation pin 56 is illustrated as being located within a different blind hole 78 than the one in which it is seated in FIG. 5, In any case, the beveled surface 68 provides clearance between the upper coupler 16 and the anti-rotation pins 54, 56 or 58 regardless of which one of the pins 54-58 is seated within any one of the blind holes 78.

A generally similar mounting arrangement is provided between the lower coupler 18 and the vehicle mounting element 22. Referring to the embodiment illustrated in FIGS. 1 and 3, the lower coupler 18 comprises a body portion 88 having a planar surface 90 and a beveled surface 92. Two spaced arms 94 and 96 extend downwardly from the body portion 88 to receive the lower end of shaft 20 which is coupled thereto by a bolt 98. A number of blind holes 100, each defining a cavity, are formed in the body portion 88. The blind holes 100 are circumferentially spaced from one another and radially spaced from a through bore 102 that passes through the body portion 88 at the center of the planar surface 90. The blind holes 100 extend from the planar surface 90 of the body portion 88 in a direction toward the arms 94, 96.

As noted above, the vehicle mounting element 22 of the handlebar mount 10 depicted in FIG. 1 includes upper and lower clamp sections 24 and 26. Referring to the embodiment shown in FIG. 3, the upper clamp section 24 is formed with a planar surface 104 that rests against the planar surface 90 of the lower coupler 18 when the vehicle mounting element 22 and lower coupler 18 are assembled. An internally threaded bore 106 is centered in the upper clamp section 24, extending from its planar surface 104 toward the lower clamp section 26, and an anti-rotation pin 108 extends outwardly from the planar surface 104 of upper clamp section 24 in a position radially spaced from the internally threaded bore 106. When assembled, the through bore 102 in the lower coupler 18 aligns with the internally threaded bore 106 in the upper clamp section 24 and the anti-rotation pin 108 of the upper clamp section 24 seats within one of the blind holes 100 in the lower coupler 18. Depending upon which blind hole 100 receives the anti-rotation pin 108, the lower coupler 18 can be positioned at different angles relative to the vehicle mounting element 22.

An alternative embodiment of the lower coupler 18 and vehicle mounting element 22 is illustrated in FIG. 10. The structure of lower coupler 18 and vehicle mounting element 22 is the same as that shown in FIG. 3, except the position of the anti-rotation pin 108 and blind holes 100 is reversed. Specifically, in FIG. 10 an anti-rotation pin 109 is mounted on the planar surface 90 of the lower coupler 18 and a number of blind holes 101 are formed in the planar surface 104 of the upper clamp section 24 of the vehicle mounting element 22. The blind holes 101 are circumferentially spaced from one another and radially spaced from the threaded bore 106 at the center of upper clamp section 24 of vehicle mounting element 22. As seen in FIG. 10, the planar surface 104 of the upper clamp section 24 is wider than that of the embodiment depicted in FIGS. 1 and 3 in order to provide space for the blind holes 101. When assembled, the anti-rotation pin 109 of the lower coupler 18 is received within one of the blind holes 101 in the vehicle mounting element 22.

The same lower coupler 18 shown in FIGS. 1 and 3 is employed in the stem mount 12 illustrated in FIG. 9, but, as noted above, the vehicle mounting element 22 has a different construction than in the embodiment of FIG. 1. In the presently preferred embodiment, as best seen in FIG. 8, the upper end 32 of the rod 30 forming the vehicle mounting element 22 is formed with a planar surface 110 which rests against the planar surface 90 of the lower coupler 18 when assembled. An internally threaded bore 112 is formed in the rod 30, centered on its planar surface 110, and an anti-rotation pin 114 extends outwardly from the planar surface 110 of the rod 30 in a position radially spaced from the internally threaded bore 112. When assembled, the through bore 102 in the lower coupler 18 aligns with the internally threaded bore 112 in the rod 30 and the anti-rotation pin 114 of the rod 30 seats within one of the blind holes 100 in the lower coupler 18. A bolt 116 is inserted through the through bore 102 in the lower coupler 18 and into the internally threaded bore 112 of the rod 30 to connect the lower coupler 18 to the vehicle mounting element 22. Depending upon which blind hole 100 receives the anti-rotation pin 114, the lower coupler 18 can be positioned at different angles relative to the vehicle mounting element 22. It should be understood that the location of anti-rotation pin 114 and blind holes 100 may be reversed in the lower coupler 18 employed with stem mount 12, as in the embodiment shown in FIG. 10. In particular, the anti-rotation pin 114 may be formed on the planar surface 90 or lower coupler 18 and the planar surface 110 of the vehicle mounting element 22 may be formed with blind holes 100.

Referring now to FIGS. 11-14, an alternative embodiment of the vehicle mount 120 of this invention is illustrated. The vehicle mount 120 includes a device mounting plate 122, an upper coupler 124, a lower coupler 126 and a vehicle mounting element 128. The device mounting plate 122 is shown as circular in FIG. 11, but it could be square, rectangular or another shape, as desired. The device mounting plate 122 is formed with a number of device bores 130, and three through bores 132, 134 and 136 each having a chamfer 138. In the presently preferred embodiment, a number of through holes 140 are formed in the device mounting plate 122 which are circumferentially spaced from one another and radially spaced from the center through bore 134.

The upper coupler 124 has a generally L-shaped body potion 142 formed with a base section 144 and a leg section 146 oriented perpendicularly to one another. The base section 144 has a planar surface 148 formed with a central, internally threaded bore 150 and an anti-rotation pin 152 which is spaced from the bore 150. The leg section 146 is formed with an internally threaded bore 154, and an anti-rotation pin 156 extends outwardly from the surface 158 of leg section 146. The device mounting plate 122 and upper coupler 124 are connected to one another by a bolt 160 which may be inserted into any one of the through bores 132-136 and then threaded into the threaded bore 150 in the upper coupler 124. The anti-rotation pin 152 seats within one of the through holes 140 in the device mounting plate 122. The positioning of the upper coupler 124 relative to the three through bores 132-136, and rotation of the device mounting plate 122 relative to the upper coupler 124, is the same as that described above in connection with a discussion of the embodiment of FIGS. 1-7.

Figure 11:
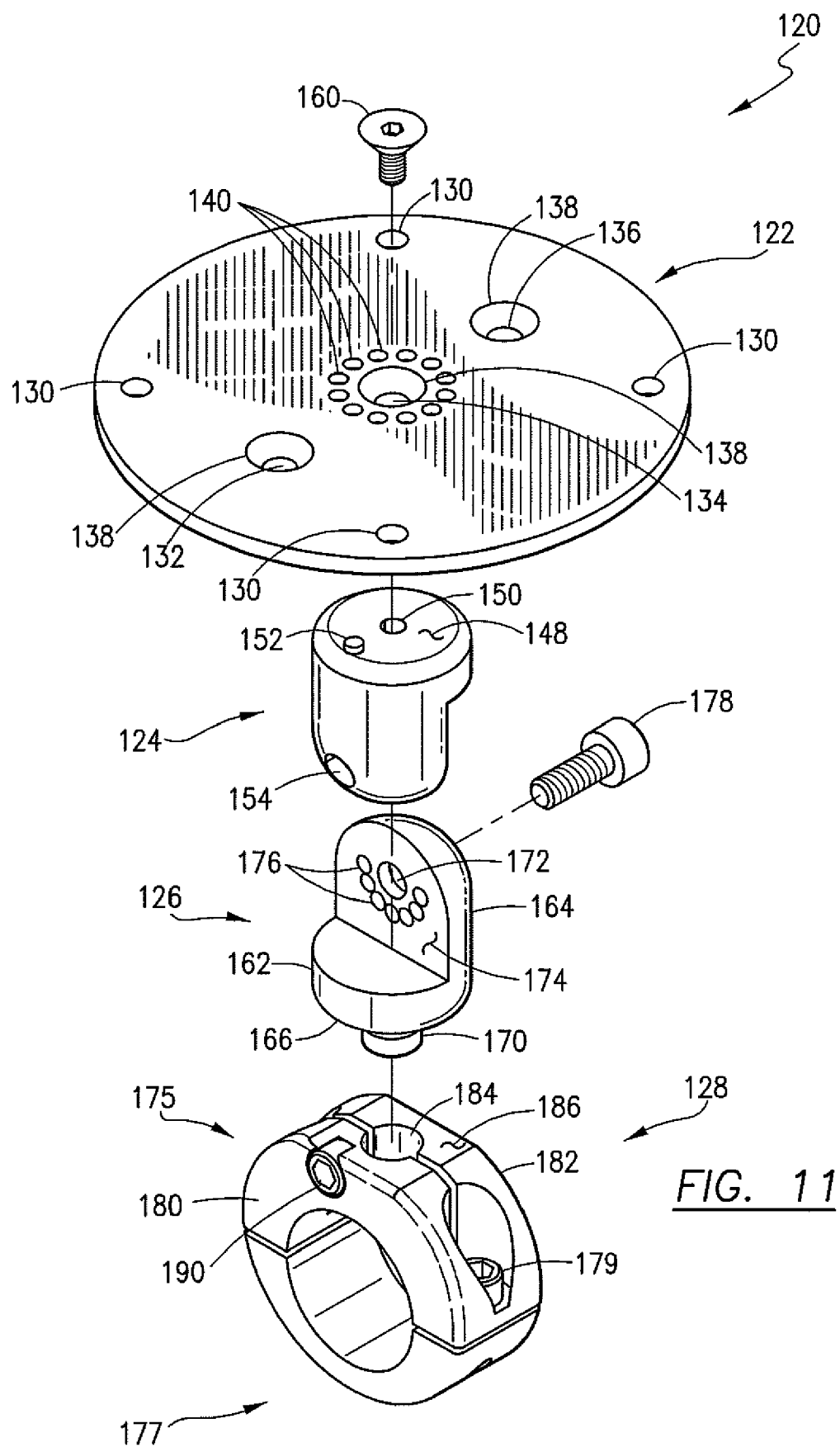
FIG. 11 is an exploded, perspective view of an alternative embodiment of the vehicle mount of this invention.

As best seen in FIG. 11, the mount 120 differs from mounts 10 and 12 in that the shaft 20 is eliminated and the upper and lower couplers 124, 126 are directly connected to one another. In the presently preferred embodiment, the lower coupler 126 has a generally L-shaped body portion formed with a base section 162 and a leg section 164 oriented perpendicularly to one another. The base section 162 is formed with a bottom surface 166 which mounts an extension 168 having a circumferential recess 170. The leg section 164 of lower coupler 126 has a through bore 172 and a planar surface 174 formed with a number of inwardly extending blind holes 176.

The upper and lower couplers 124, 126 are connected to one another by placing their respective leg sections 146 and 164 together such that the threaded bore 150 in the upper coupler 124 aligns with the through bore 172 in the lower coupler 126 and the anti-rotation pin 156 of the upper coupler 124 extends into one of the blind holes 174 in the lower coupler 126. A bolt 178 is inserted through the bore 172 in the lower coupler 126 and then into the threaded bore 154 in the upper coupler 124 where it is tightened down.

Figure 14:
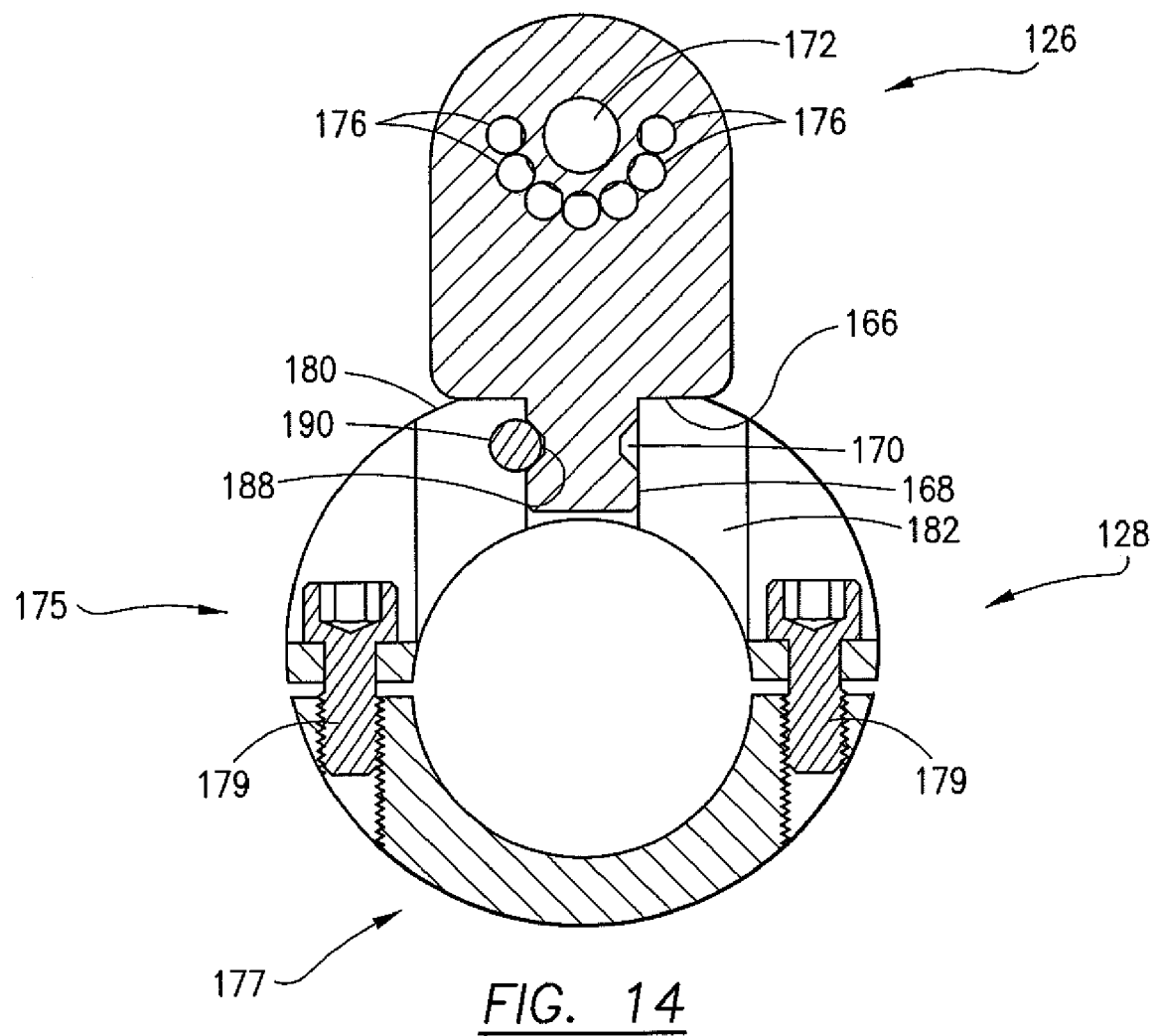
FIG. 14 is a cross sectional, assembled view of the lower coupler and vehicle mounting element illustrated in FIG. 11.

The vehicle mounting element 128 of the mount 120 includes and upper clamp section 175 connected to a lower clamp section 177 by bolts 179. In the presently preferred embodiment, the upper clamp section 175 of mount 120 is formed in two half sections 180 and 182 that may be partially separated from one another. Referring to FIGS. 11 and 14, the two half sections 180, 182 collectively form a through bore 184, which, when the half sections 180, 182 are moved apart, receives the extension 168 of the lower coupler 126. The bottom surface 166 of the lower coupler 126 rests atop a planar surface 186, collectively formed by the half sections 180, 182, with the extension 168 seated in the through bore 184. A cross bore 188 is formed in the upper clamp section 24 of the vehicle mounting element 128, comprising an unthreaded portion in half section 180 and a threaded portion in the half section 182. A bolt 190 is inserted through the unthreaded portion of cross bore 188 in half section 180 and then into the threaded portion of cross bore 188 in the half section 182. As seen in FIG. 14, the bolt 190 extends within the recess 170 formed in the extension 168 when positioned within the cross bore 188. The bolt 190 is tightened down to draw the two half sections 180, 182 together in order to secure the lower coupler 126 within the vehicle mounting element 128. Additionally, the bolt 190 is captured within the recess 170 formed in the extension 168 of the lower coupler 126 to further secure the lower coupler 126 and vehicle mounting element 128 together.

Threaded connections are employed in the mounts 10, 12 and 120 of this invention to connect the device mounting plates 14 and 122 to respective upper couplers 16 and 124, to connect the vehicle mounting elements 22 and 128 to respective lower couplers 18 and 126, and, to connect the upper and lower couplers 124, 126 to one another. While these threaded connections are generally effective to secure such components together, it has been found that vibration and jarring applied to the mounts 10, 12 and/or 120 during operation of a motorcycle or other vehicle can loosen such connections over time and cause relative rotation between the device mounting plate 14 and upper coupler 16, the device mounting plate 122 and upper coupler 124, the upper and lower couplers 124, 126, the vehicle mounting element 22 and the lower coupler 18, and/or the vehicle mounting element 128 and lower coupler 126. This potential problem of relative rotation is addressed by the provision of the anti-rotation pins 54, 56 and 58 located on the device mounting plate 14, the anti-rotation pin 108 of vehicle mounting element 22, the anti-rotation pin 114 on the rod 30, the anti-rotation pin 109 on the lower coupler 18, and, the anti-rotation pins 152 and 156 on the upper coupler 124. These anti-rotation pins 54-58, 108, 109, 114, 152 and 156 seat within respective blind holes 78, 100, 101, 176, or within through holes 140, as discussed above, to resist disengagement of the components of the mounts 10, 12 and 120 even in the event of loosening of a threaded connection between them.

Another important feature of the anti-rotation pins 54-58, 108, 109, 114, 152 and 156 relates to the performance of the mounts 10, 12 and 120 during an accident or other occasion when a severe force is applied to the mounts 10, 12, or 120 and/or to the vehicle on which they are mounted. In one presently preferred embodiment, each of the device mounting plates 14 and 122, the upper couplers 16 and 124, the lower couplers 18 and 126, and, the vehicle mounting elements 22 and 128 are made of a relatively soft material such as aluminum. The anti-rotation pins 54-58, 108, 109, 114, 152 and 156, on the other hand, may be formed of a material that is harder than aluminum, such as steel, or of material having less hardness than aluminum. For purposes of the present discussion, the term "hardness" refers to the property of a metal which gives it the ability to resist permanent deformation, e.g. being bent, broken or undergoing a change in shape, in response to the application of a load. The greater the hardness of a metal, the more resistant it is to deformation. While the anti-rotation pins 54-58, 108, 109, 114, 152 and 156 function to resist rotation of components during normal operation of the mounts 10, 12 and 120, as described above, in response to the application of a severe force to the mounts 10, 12, 120, or to the vehicle that carries them, shearing occurs at the point of connection of the anti-pins 54-58, 108, 109, 114, 152 and 156 to respective components 14, 16, 18, 22, 122, 124 and 126. If the pins 54-58, 108, 109, 114, 152 and 156 are formed of a material having a hardness greater than that of the components 14, 16, 18, 22, 122 and 126, then shearing occurs in between the blind holes 78, 100, 101, 124 and 176, or between the through holes 140. Alternatively, if the hardness of the components 14, 16, 18, 22, 122 and 126 exceeds that of the anti-rotation pins 54-58, 108, 109, 114, 152 and 156, then they will shear off in response to the application of a force. In either case, relative rotation between the device mounting plates 14, 122 and upper couplers 16, 124, between the vehicle mounting elements 22, 128 and the lower couplers 18, 126, and, between the upper and lower couplers 124, 126, is permitted to the extent that the bolts that connect them together are loosened by such force. In essence, at least some rotation of such components provides "give" in the mounts 10, 12 and 120 so that a portable device carried by the device mounting plates 14 and 122 does not become a projectile during an accident. By allowing some "give" in the components of mounts 10, 12 and 120 during an accident, the force applied to the portable device tends to allow at least a limited rotation of such device rather than causing it to fly off of the mount 10, 12 or 120 potentially causing injury to the rider or others.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof.

For example, the upper and lower pivots 16, 18 shown in the Figs. are of the type that permit rotation about the axis of the bolts 74 and 98 that mount the shaft 20 to such pivots 16, 18. It should be understood that other types of pivots may be employed, including ball-and-socket type pivots or others that permit motion about multiple axes.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for mounting a portable device to a vehicle, comprising:
   a vehicle mounting element adapted to mount to the vehicle, said vehicle mounting element having a first clamping section, a mating second clamping section, a first bore partially formed in each of said first and second clamping sections and a cross bore extending between said first and second clamping sections which intersects said first bore;
   a first coupler formed with a first surface and an extension, said extension having a first end portion, a second end portion and a circumferentially extending recess located between said first and second end portions, each of said first and second end portions having a diameter which is greater than the diameter of said recess, said extension being received within said first bore and rotatable therein to any position wherein at least a portion of said recess aligns with said cross bore;
   a mounting element insertable within said cross bore of said vehicle mounting element and into said portion of said recess which aligns with said cross bore, said mounting element being captured within said recess of said extension between said first and second end portions thereof, said mounting element being effective to urge said first and second clamping sections toward one another to clamp said extension between them;
   a second coupler formed with a second surface and a third surface engageable within said first surface of said first coupler, one of said first surface of said first coupler and said third surface of said second coupler being formed with at least one first cavity and the other of said first and third surfaces being formed with a first anti-rotation pin, said first and second couplers being connected to one another so that said first anti-rotation pin seats within said at least one first cavity to resist relative rotational movement between said first and second couplers;
   a device mounting plate which is effective to support the portable device in position for ready access by an operator or passenger of the vehicle, one of said device mounting plate and said second surface of said second coupler being formed with at least one second cavity and the other of said device mounting plate and said second surface of said second coupler being formed with a second anti-rotation pin, said device mounting plate and said second coupler being connected to one another so that said second anti-rotation pin seats within said at least one second cavity to resist relative rotational movement between said second coupler and said device mounting plate.

2. The apparatus of claim 1 in which said one of said first coupler and said second coupler having said at least one first cavity being formed of a first material, said first anti-rotation pin being formed of a second material, one of said first and second materials having a hardness greater than the other so that in response to the application of a force to the apparatus one of said first anti-rotation pin and said first or second couplers undergoes shearing causing said first anti-rotation pin to break off or causing said first anti-rotation pin to break through said at least one first cavity thus permitting relative rotation between said first and second couplers.

3. The apparatus of claim 1 in which said one of said second coupler and said device mounting plate having said at least one second cavity being formed of a first material, said second anti-rotation pin being formed of a second material, one of said first and second materials having a hardness greater than the other so that in response to the application of a sufficient force to the apparatus one of said second anti-rotation pin and said second coupler or device mounting plate undergoes shearing causing said second anti-rotation pin to break off or causing said second anti-rotation pin to break through said at least one second cavity thus permitting relative rotation between said second coupler and said device mounting plate.

4. The apparatus of claim 1 in which said at least one first cavity comprises a number of blind holes.

5. The apparatus of claim 4 in which said first anti-rotation pin is positionable into any one of said blind holes, the position of said first and second couplers relative to one another being varied depending upon in which one of said blind holes said first anti-rotation pin is seated.

6. The apparatus of claim 1 in which said at least one second cavity comprises a number of through bores formed in said device mounting plate.

7. The apparatus of claim 6 in which said second anti-rotation pin is formed on said second surface of said second coupler, said second anti-rotation pin being positionable into any one of said through bores, the position of said second coupler and said device mounting plate relative to one another being varied depending upon in which one of said through bores said second anti-rotation pin is seated.

8. Apparatus for mounting a portable device to a vehicle, comprising:
   a vehicle mounting element, said vehicle mounting element being adapted to mount to the vehicle;
   a first coupler;
   a first mounting element connecting said first coupler and said vehicle mounting element;
   a device mounting plate which is effective to support the portable device in position for ready access by the operator or passenger of the vehicle;
   a second coupler, one of said second coupler and said device mounting plate being formed with an anti-rotation pin and the other of said second coupler and said device mounting plate being formed with at least one cavity;
   a second mounting element connecting said second coupler and said device mounting plate so that said anti-rotation pin seats within said at least one cavity to resist relative rotational movement between said second coupler and said device mounting plate;
   said one of said second coupler and said device mounting plate having said at least one cavity being formed of a first material and said anti-rotation pin being formed of a second material, one of said first and second materials having a hardness greater than the other so that in response to the application of a sufficient force to said apparatus one of said anti-rotation pin and said device mounting plate undergoes shearing causing said anti-rotation pin to break off or causing said anti-rotation pin to break through said at least one cavity thus permitting relative rotation between said second coupler and said device mounting plate;

said first coupler and said second coupler being connected to one another.

9. The apparatus of claim 8 in which said device mounting plate is formed with a first surface, said anti-rotation pin extending outwardly from said first surface of said device mounting plate, said second coupler being formed with a second surface, said at least one cavity extending inwardly from said second surface of said second coupler, said anti-rotation pin of said device mounting plate being received within said at least one cavity of said second coupler.

10. Apparatus for mounting a portable device to a vehicle, comprising:
a vehicle mounting element adapted to mount to a vehicle;
a device mounting element which is effective to support the portable device in position for ready access by an operator or passenger of the vehicle;
a coupling structure connecting said vehicle mounting element and said device mounting element;
one of said vehicle mounting element and said coupling structure being formed with an extension and the other of said vehicle mounting element and said coupling structure being formed with a first clamping section at least partially separated from a second clamping section, said extension having a first end portion, a second end portion and a circumferentially extending recess located between said first and second end portions, each of said first and second end portions having a diameter which is greater than the diameter of said recess, a first bore partially formed in each of said first and second clamping sections and a second bore partially formed in each of said first and second sections which intersects said first bore, said extension being insertable within said first bore and rotatable therein to any position wherein at least a portion of said recess of said extension aligns with said second bore;
a mounting element insertable within said second bore and into said portion of said recess which aligns with said second bore, said mounting element being captured within said recess of said extension between said first and second end portions thereof, said mounting element being effective to urge said first and second clamping sections toward one another to clamp said extension between them.

11. The apparatus of claim 10 in which said first and second bores are substantially perpendicular to one another.

12. The apparatus of claim 10 in which one of said vehicle mounting element and said coupling structure is formed with a slot, said slot separating said first and second clamping sections from one another.

13. The apparatus of claim 12 in which said first bore is partially formed in each of said first and second clamping sections and spans said slot.

14. The apparatus of claim 12 in which said second bore has a first portion formed in said first clamping section, and a second portion formed in said second clamping section, said first and second portions of said second bore aligning with one another and being separated by said slot.

15. The apparatus of claim 14 in which at least one of said first and second portions of said second bore is internally threaded.

16. Apparatus for mounting a portable device to a vehicle, comprising:
a vehicle mounting element adapted to mount to a vehicle;
a device mounting element which is effective to support the portable device in position for ready access by an operator or passenger of the vehicle;
a coupling structure extending between said vehicle mounting element and said device mounting element;
a joint connection which is effective to connect said coupling structure to at least one of said vehicle mounting element and said device mounting element, said joint connection comprising:
(i) an extension formed on at least one of said vehicle mounting element, said device mounting element and said coupling structure, said extension having a first end portion, a second end portion and a circumferentially extending recess located between said first and second end portions, each of said first and second end portions having a diameter which is greater than the diameter of said recess;
(ii) a slot formed in at least one of the other of said vehicle mounting element, said device mounting element and said coupling structure, said slot defining a first clamping section and second clamping section;
(iii) a first bore partially formed in each of said first and second clamping sections and spanning said slot;
(iv) a second bore partially formed in each of said first and second clamping sections which intersects said first bore, said extension being insertable within said first bore and rotatable therein to any position wherein at least a portion of said recess of said extension aligns with said second bore;
(v) a mounting element insertable within said second bore and into said portion of said recess which aligns with said second bore, said mounting element being captured within said recess of said extension between said first and second end portions thereof, said mounting element being effective to urge said first and second clamping sections toward one another to clamp said extension between them.

17. The apparatus of claim 16 in which said second bore has a first portion formed in said first clamping section and a second portion formed in said second clamping section, said first and second portions of said second bore aligning with one another and being separated by said slot.

18. The apparatus of claim 16 in which said first and second bores are substantially perpendicular to one another.

19. The apparatus of claim 16 in which said vehicle mounting element comprises an upper body portion and a lower body portion, said upper and lower body portions being separable from one another for placement about the handlebar of the vehicle and being adapted to be clamped in place on the handlebar, said upper body portion being formed with said slot defining said first and second clamping sections and said coupling structure being formed with said extension.

* * * * *